(12) United States Patent
Yokoyama et al.

(10) Patent No.: US 8,887,761 B2
(45) Date of Patent: Nov. 18, 2014

(54) VALVE OPENING AND CLOSING MECHANISM

(75) Inventors: Masayuki Yokoyama, Tokyo (JP); Sotsuo Miyoshi, Tokyo (JP); Satoru Hasegawa, Tokyo (JP); Katsunori Takai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 424 days.

(21) Appl. No.: 13/320,721

(22) PCT Filed: Apr. 2, 2010

(86) PCT No.: PCT/JP2010/002434
§ 371 (c)(1),
(2), (4) Date: Nov. 15, 2011

(87) PCT Pub. No.: WO2011/024341
PCT Pub. Date: Mar. 3, 2011

(65) Prior Publication Data
US 2012/0056118 A1    Mar. 8, 2012

(30) Foreign Application Priority Data

Aug. 24, 2009    (WO) .................. PCT/JP2009/004064

(51) Int. Cl.
| | |
|---|---|
| *F16K 1/24* | (2006.01) |
| *F16K 35/14* | (2006.01) |
| *F02M 25/07* | (2006.01) |
| *F16K 1/22* | (2006.01) |
| *F16K 31/04* | (2006.01) |

(52) U.S. Cl.
CPC ............ *F16K 35/14* (2013.01); *F02M 25/0786* (2013.01); *F02M 25/0729* (2013.01); *F16K 1/223* (2013.01); *F02M 25/0773* (2013.01); *F16K 31/043* (2013.01); *Y02T 10/121* (2013.01)
USPC ............ 137/601.11; 137/630.19; 251/129.11; 251/248; 251/279

(58) Field of Classification Search
USPC .......... 137/554, 595, 601.05, 601.08, 601.11, 137/630.19; 251/129.11, 129.12, 248, 279, 251/313
See application file for complete search history.

(56) References Cited

U.S. PATENT DOCUMENTS

| | | |
|---|---|---|
| 4,346,728 A | 8/1982 | Sulzer |
| 4,749,004 A | 6/1988 | Peash |
| 6,926,250 B1 | 8/2005 | Hashimoto et al. |

(Continued)

FOREIGN PATENT DOCUMENTS

| | | |
|---|---|---|
| DE | 31 08 090 A1 | 9/1982 |
| DE | 4401559 C1 | 5/1995 |

(Continued)

*Primary Examiner* — John Rivell
*Assistant Examiner* — Reinaldo Sanchez-Medina
(74) *Attorney, Agent, or Firm* — Birch, Stewart, Kolasch & Birch, LLP (57) ABSTRACT

A valve opening and closing mechanism includes: an input shaft 2 driven by a power source; two or more output shafts 5, 6 respectively including valves 3, 4; power transmission members that transmit power from the input shaft 2 to the respective output shafts 5, 6 with varying a phase of the power; and preload application members that apply preloads respectively to the output shafts 5, 6 and the power transmission member in opposite directions. The output shafts 5, 6 may be separated from the power transmission member.

9 Claims, 9 Drawing Sheets

(56) References Cited

U.S. PATENT DOCUMENTS

| | | | |
|---|---|---|---|
| 7,334,565 | B2 | 2/2008 | Hanasato |
| 7,669,581 | B2 * | 3/2010 | Sasaki ............................ 123/399 |
| 8,684,033 | B2 * | 4/2014 | Albert et al. ............. 137/601.11 |
| 2003/0136930 | A1 * | 7/2003 | Dowden et al. .......... 251/129.11 |
| 2004/0026647 | A1 | 2/2004 | Hashimoto |
| 2008/0258089 | A1 * | 10/2008 | Hara ........................ 251/129.12 |
| 2009/0293973 | A1 | 12/2009 | Albert et al. |

FOREIGN PATENT DOCUMENTS

| | | |
|---|---|---|
| EP | 2067977 A2 | 6/2009 |
| FR | 2 926 126 A1 | 7/2009 |
| JP | 108656 C2 | 12/1934 |
| JP | 41-3994 Y1 | 3/1966 |
| JP | 51-113223 U | 9/1976 |
| JP | 57-40184 A | 3/1982 |
| JP | 7-1376 U | 1/1995 |
| JP | 10-132109 A | 5/1998 |
| JP | 11-190444 A | 7/1999 |
| JP | 2001-324034 A | 11/2001 |
| JP | 2002-298528 A | 10/2002 |
| JP | 2004-132290 A | 4/2004 |
| JP | 2004-293573 A | 10/2004 |
| WO | WO 03/006860 A1 | 1/2003 |
| WO | WO 03/006861 A1 | 1/2003 |

* cited by examiner

VALVE OPENING AND CLOSING MECHANISM

TECHNICAL FIELD

The present invention relates to a valve opening and closing mechanism that controls opening and closing of two or more valves asynchronously using a single power source (actuator).

BACKGROUND ART

Patent Document 1 may be cited as a conventional mechanism for opening and closing two or more passages by controlling two or more valves using a single power source. The mechanism described in Patent Document 1 uses a gear as a power transmission mechanism, and both the gear and an output shaft are fixed. Further, Patent Document 2 may be cited as a conventional mechanism for controlling opening and closing of two or more passages asynchronously. The mechanism described in Patent Document 2 applies a preload to the output shaft alone and does not apply a preload directly to the gear.

PRIOR ART DOCUMENTS

Patent Documents

Patent Document 1: Japanese Patent Application Publication 2004-132290
Patent Document 2: Publication of FR2926126

SUMMARY OF THE INVENTION

With the configuration described in Patent Document 1, however, the gear and respective output shafts connected to the single power source cannot be operated individually. Therefore, there is a problem such that in an EGR system for returning exhaust gas from an engine to an intake side, two different types of valves, namely an EGR value for controlling an exhaust gas flow rate and a switch valve for switching a passage, and two corresponding power sources are required.

Further, with the configuration described in Patent Document 2, although the two or more passages can be subjected to open/close control asynchronously, a preload is not applied to the gear; thus, run-out occurs in a power transmission member in an amount corresponding to gear backlash and link rattles due to vibration and the like, leading to wear and noise. Further, when a position sensor is provided on the single power transmission member and the rattles occur while detecting the position of another output shaft, the position cannot be detected accurately, which poses a problem.

The present invention is made to solve the aforementioned problems, and an object of the invention is to provide a valve opening and closing mechanism that controls opening and closing of two or more valves asynchronously using a single power source to suppress wear and noise, and enable an accurate position detection by a sensor disposed on a power transmission member.

A valve opening and closing mechanism according to the present invention includes: an input shaft; two or more output shafts respectively including valves; power transmission members that transmit power from the input shaft to the respective output shafts with varying a phase of the power; and preload application members that apply preloads respectively to the output shafts and the power transmission members in opposite directions.

According to the invention, opening patterns of the valves provided respectively in the output shafts can be set variously by transmitting the power of the input shaft to the output shafts with varying the phase thereof. Further, the respective output shafts are separated from the power transmission members, and therefore heat transmission can be mitigated when controlling a flow rate of high-temperature gas.

Then, since preloads are applied to the output shafts, the valves can be returned to desired positions (set as initial positions) during a failure. Thus, the effects of vibration and gas pressure pulsation can be suppressed, and the valves can be held in the initial positions with stability even when not energized.

Further, preloads are applied to the power transmission members in an opposite direction to those applied to the output shafts, and therefore run-out occurring in the power transmission members in an amount corresponding to gear backlash and link rattling due to vibration can be suppressed, enabling suppression of noise and wear. Since the power transmission member does not run out relative to the output shaft, the position of the output shaft can be measured accurately by disposing a sensor magnet on the power transmission member. When a sensor magnet is disposed on the power transmission member, the position of another output shaft can be measured using the same sensor magnet.

BRIEF DESCRIPTION OF THE DRAWINGS

FIG. 8(*a*) is a plan view and FIG. 8(*b*) is a transverse sectional view taken along a line 8-8 in FIG. 8(*a*).
FIG. 9(*a*) is a plan view and FIG. 9(*b*) is a transverse sectional view taken along a line 9-9 in FIG. 9(*a*).

BEST MODE FOR CARRYING OUT THE INVENTION

In the following, to describe the present invention in further detail, embodiments of the invention will be described with reference to the attached drawings.

First Embodiment

Figure 1:
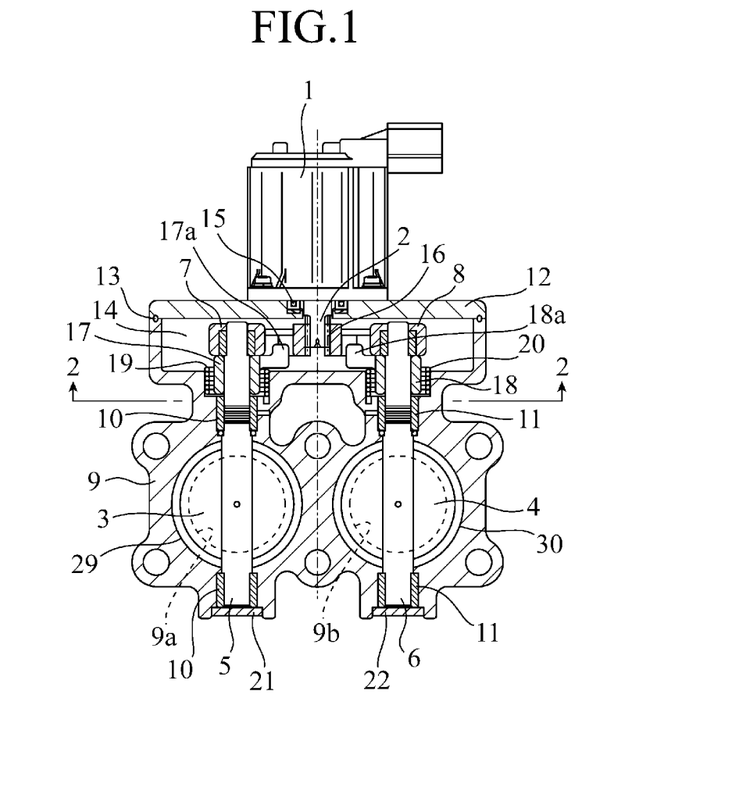
FIG. 1 is a front view showing a partial longitudinal cross-section of a valve opening and closing mechanism according to the present invention.
Figure 2:
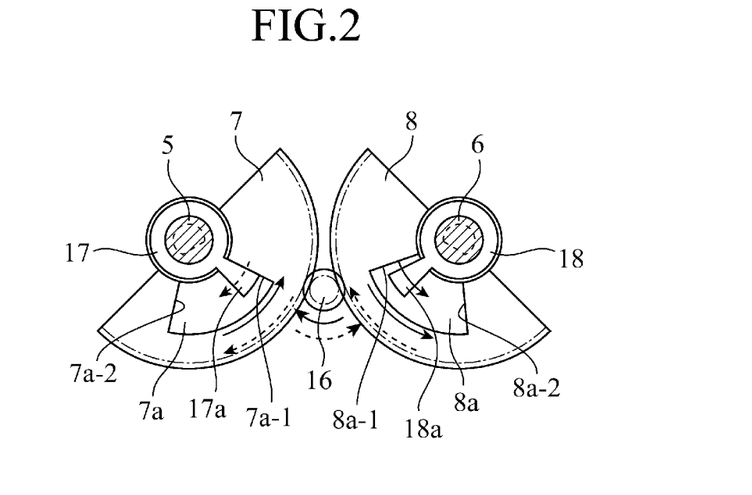
FIG. 2 is a transverse sectional view taken along a line 2-2 in FIG. 1.

FIG. 1 is a constitutional diagram showing a partial longitudinal cross-section of a valve opening and closing mechanism according to a first embodiment of the present invention, and FIG. 2 is a transverse sectional view taken along a line 2-2 in FIG. 1. This valve opening and closing mechanism includes a motor 1 serving as a power source, an input shaft 2 for inputting power from the motor 1 into a valve side, gears 7, 8 for transmitting the power from the input shaft 2 to output shafts 5, 6 respectively having valves 3, 4, and a valve housing 9 for housing these components and so on.

A passage 9a that passes through a cooler and a passage 9b that does not pass through the cooler are formed in the valve housing 9 in parallel. The output shafts 5, 6 are supported to be free to rotate via bearings 10, 11 so as to intersect and penetrate the passages 9a, 9b. An attachment substrate 12 of the motor 1 is attached via packing 13 to an upper end of a peripheral side wall of a recessed portion provided in an upper portion of the valve housing 9, and the recessed portion serves as a gear housing chamber 14.

The input shaft 2 is supported on the substrate 12 to be capable of rotating via a bearing 15, and a pinion gear 16 is attached to a tip end portion thereof. The gears 7, 8 are attached rotatably to tip end portions of the output shafts 5, 6 infiltrating the gear housing chamber 14, and the gears 7, 8 respectively mesh with the pinion gear 16. Fan-shaped holes 7a, 8a are formed respectively in the gears 7, 8.

Further, tubular bodies 17, 18 are attached to the output shafts 5, 6 in proximity to the gears 7, 8, and arm members 17a, 18a provided respectively on the tubular bodies 17, 18 are positioned within the holes 7a, 8a in the gears 7, 8 to abut against respective hole surfaces. Coil springs 19, 20 serving as preload application members are wound around respective outer peripheries of the tubular bodies 17, 18, and the output shafts 5, 6 are preloaded in a valve closing direction at all times by the coil springs 19, 20. Sealing members 21, 22 are provided in the valve housing 9 opposite respective lower end portions of the output shafts 5, 6 in order to seal the lower end portions. The pinion gear 16, gear 7 (8), hole 7a (8a), arm member 17a (18a), and tubular body 17 (18) together constitute a power transmission member between the input shaft 2 and the output shaft 5 (6).

In the following, an operation of the valve opening and closing mechanism according to the first embodiment will be described on the basis of FIGS. 1 and 2. FIGS. 1 and 2 show a condition in which the valves 3, 4 attached to the output shafts 5, 6 are closed. When the pinion gear 16 integrated with the input shaft 2 of the motor 1 rotates leftward in this condition (as shown by dotted line arrows in the drawing), the gears 7, 8 meshing with the pinion gear 16 respectively rotate in a rightward direction. Accordingly, a hole surface 7a-1 of the gear 7 abuts against the arm member 17a such that the output shaft 5 is rotated in the rightward direction via the tubular body 17, and as a result, the valve 3 is opened. On the other hand, the gear 8 rotates in a direction for causing a hole surface 8a-1 thereof to move away from the arm member 18a, and therefore the output shaft 6 cannot rotate. As a result, the valve 4 is maintained in the closed condition.

Further, when the pinion gear 16 integrated with the input shaft 2 of the motor 1 rotates rightward in the condition shown in FIGS. 1 and 2 (as shown by solid line arrows in the drawing), the gears 7, 8 meshing with the pinion gear 16 respectively rotate in a leftward direction. Accordingly, the gear 7 rotates in a direction for causing the hole surface 7a-1 to move away from the arm member 17a, and therefore the output shaft 5 cannot rotate. As a result, the valve 3 is maintained in the closed condition. On the other hand, the hole surface 8a-1 of the gear 8 abuts against the arm member 18a such that the output shaft 6 is rotated via the tubular body 18, and as a result, the valve 4 is opened. When openings of the valves 3, 4 are controlled in accordance with an amount of energization applied to the motor 1 at this time, a flow rate of exhaust gas flowing through the passage 9a or the passage 9b can be controlled.

As described above, with the valve opening and closing mechanism according to the first embodiment of the invention, the valves 3, 4 provided in the output shafts 5, 6 can be controlled asynchronously in accordance with a rotation direction of the input shaft, and various valve opening patterns can be set. Further, the output shafts 5, 6 are respectively separated from the arm members 17a, 18a, and therefore heat transmission can be mitigated when the flow rate of high-temperature gas is controlled. Furthermore, the output shafts 5, 6 are preloaded in the valve closing direction by the coil springs 19, 20, and therefore the valves can be closed such that positions thereof when the actuator 1 is not energized can be prescribed and run-out due to vibration can be suppressed.

Further, respective distances between the arm members 17a, 18a and the hole surfaces 7a-1, 8a-1 when the valves are open may be optionally set. In other words, when a speed reduction ratio of the power transmission member is made variable, respective operating ranges of the output shafts can be optionally set for each valve, and a distance between the valves can also be modified. Moreover, when an axial direction arrangement of the power transmission member is made variable, interference between power transmission members can be avoided even when the distance between the valves is small.

Figure 3:
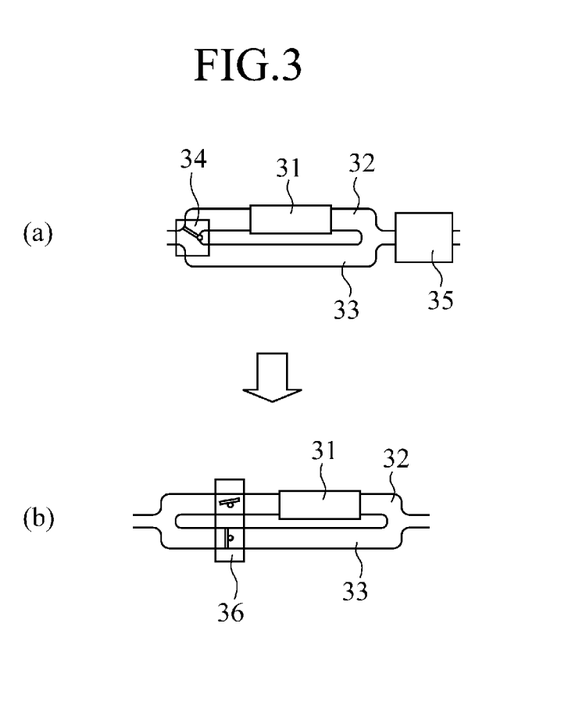
FIG. 3 is a schematic constitutional diagram showing the valve opening and closing mechanism according to the invention.

FIG. 3 is an illustrative view showing a case in which the valve opening and closing mechanism according to the first embodiment of the invention is used to control a flow rate and switch between a passage that passes through a cooler and a passage that does not pass through the cooler, in comparison with a conventional example. In an EGR system for returning exhaust gas from an engine to an intake side, an EGR effect is improved by reducing a gas temperature, and therefore a cooler 31 is provided. However, when the gas temperature is low during startup of an engine or the like, the gas temperature is reduced excessively. Therefore, a passage 32 that passes through the cooler 31 and a passage 33 that does not pass through the cooler 31 are provided. Accordingly, in a conventional configuration shown in FIG. 3(a), it is required that an EGR valve 35 for controlling the gas flow rate and a switch valve 34 for switching between the passage 32 that passes through the cooler 31 and the passage 33 that does not pass through the cooler 31 are provided.

In contrast, when the valve opening and closing mechanism according to the first embodiment of the invention is used as an EGR valve 36, on the other hand, the control of the gas flow rate and the switch of the passages can be performed by the single EGR valve 36, and therefore the switch valve 34 required in the conventional configuration can be eliminated, which enables structural simplification and a cost reduction. Further, the switch valve 34 and the EGR valve 35 provided in two locations of the gas flow passage can be replaced by the single EGR valve 36, and therefore pressure loss can be halved.

Second Embodiment

Figure 4:
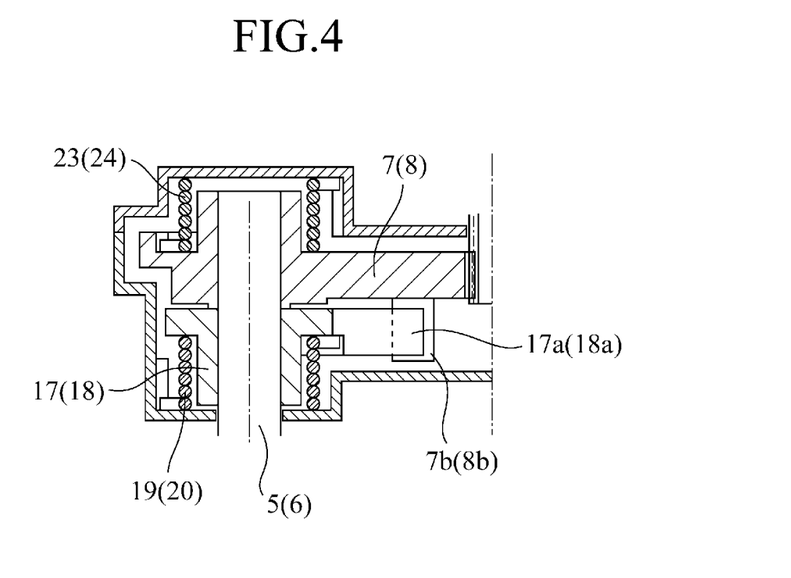
FIG. 4 is a longitudinal sectional view showing the main parts of a configuration for applying a preload to a gear in an opposite direction to preloads applied to respective output shafts.

FIG. 4 is a longitudinal sectional constitutional view of a part showing a valve opening and closing mechanism according to a second embodiment of the invention. In this valve opening and closing mechanism, coil springs 23, 24 are attached respectively to the gears 7, 8 as preload application members such that preloads are applied to the gears 7, 8 in an opposite direction to the preloads applied to the output shafts 5, 6 by the coil springs 19, 20. In this case, one end of the coil springs 23, 24 is fixed to the gears 7, 8 and another end is fixed to the valve housing 9; thus, even when the motor 1 is not energized and the hole surfaces 7a-1, 8a-1 of the gears 7, 8 are not in contact with the arm members 17a, 18a, run-out of the gears 7, 8 can be suppressed due to the preloads applied by the coil springs 23, 24, and as a result, wear on the gears 7, 8 can be suppressed.

Third Embodiment

Figure 5:
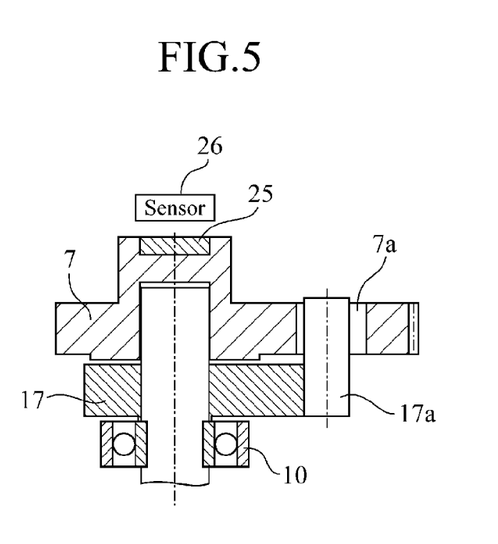
FIG. 5 is a partial longitudinal sectional view showing a condition in which a sensor is disposed opposite a magnet of a gear crown portion.

FIG. 5 is a longitudinal sectional constitutional view showing a part of the configuration of a valve opening and closing mechanism according to a third embodiment of the invention. In this valve opening and closing mechanism, a sensor 26 is disposed opposite a magnet 25 provided in a gear crown portion in order to increase a resolution. Specifically, the gear continues to move even when the valve on one side is inoperative, and therefore the gear does not run out relative to the output shaft even when positions of the respective valves are detected. Thus, when the sensor 26 is simply disposed opposite the magnet 25 in the gear crown portion on one side thereof, the positions of the valves on both sides can be detected. Note that when a valve is stuck or the like, the gear position and the valve position may not match, and therefore the sensor 26 may be disposed on the output shafts or the arm members on both sides opposite the magnets disposed in the gears.

Fourth Embodiment

Figure 6:
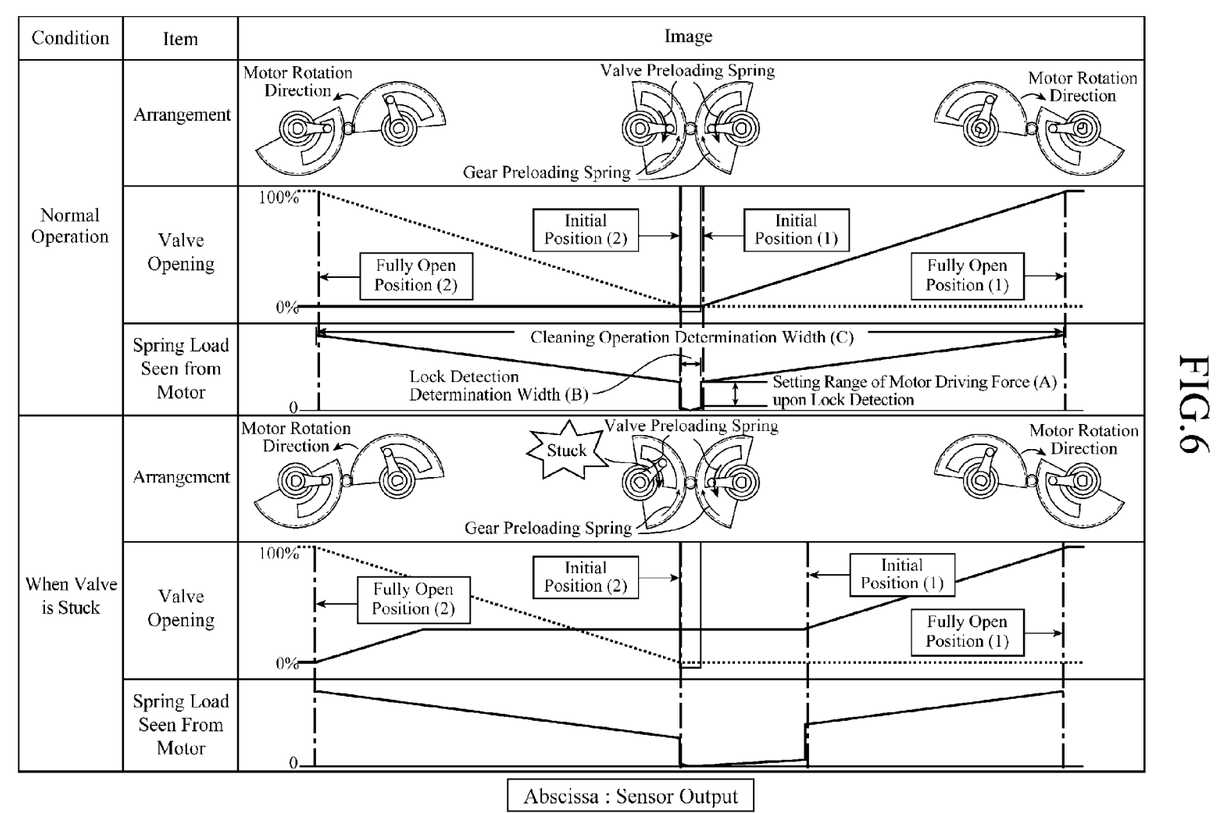
FIG. 6 is a view showing a valve opening relative to a gear operation and a spring load seen from a motor both in a normal condition and in a valve stuck condition.

FIG. 6 is a view showing a valve opening and closing mechanism according to a fourth embodiment of the invention and illustrating a valve opening relative to operations of the gears 7, 8 and a spring load seen from the motor 1 both during a normal operation and when a valve is stuck. In this valve opening and closing mechanism, abutment portions between the arm members 17a, 18a and the output shafts 5, 6 are provided in an opposite direction to a driving direction, and therefore a valve can be closed forcibly by a driving force from the motor 1 even when the valve is stuck or the like. Note that the abscissa on the drawing illustrating the valve opening indicates the position of the motor 1, assuming that a step sensor is formed integrally with the motor 1 at 10° intervals such that initial positions (1), (2) and fully open positions (1), (2) correspond to step sensor outputs.

During the normal operation, when the motor 1 is not energized or inoperative, the valves 3, 4 are held in the closed condition by a valve preloading spring (central drawing in FIG. 6). When the pinion gear 16 is rotated in a clockwise direction in this condition, the gears 7, 8 rotate in a counterclockwise direction. As a result, the arm member 18a is pushed by the hole surface 8a-1 of the gear 8 to rotate in the counterclockwise direction, and in accordance with this rotation, the valve 4 is opened. On the other hand, the gear 7 rotates in a direction for causing the hole surface 7a-1 to move away from the arm member 17a, and therefore the valve 3 is not opened.

Further, when the pinion gear 16 is rotated in the counterclockwise direction while the valves 3, 4 are closed, the gears 7, 8 rotate in the clockwise direction. As a result, the arm member 17a is pushed by the hole surface 7a-1 of the gear 7 to rotate in the clockwise direction, and in accordance with this rotation, the valve 3 is opened. On the other hand, the gear 8 rotates in a direction for causing the hole surface 8a-1 to move away from the arm member 18a, and therefore the valve 4 is not opened.

Therefore, the valves 3, 4 are opened and closed asynchronously relative to the counterclockwise and clockwise direction rotation of the pinion gear 16. Here, a setting range of a lock detection driving force (A) is set as the driving force supplied to the motor 1 when the valves 3, 4 are closed, a lock detection determination width (B) is set as a closed region of the valves 3, 4, and a cleaning operation determination width (C) is set as an operable range of the valves 3, 4.

Next, an operation performed when a valve is stuck will be described. The illustrated example shows a case in which when the motor 1 is not energized or inoperative due to the mixing of foreign matter or the like on the way to opening of the valve 3; as a result, the valve 3 is not closed by the valve preloading spring.

When the pinion gear 16 is rotated in the counterclockwise direction in this condition, the gears 7, 8 should rotate in the clockwise direction and the arm member 17a should be pushed by the hole surface 7a-1 of the gear 7 so as to rotate in the clockwise direction. Since the valve 3 is stuck, however, the arm member 17a has not returned to a predetermined position, and therefore a spring force applied to the gear 7 is small; thus, the gear 7 is to be rotated by a small driving force supplied to the motor 1, and therefore sticking, that is, locking of the valve 3 is detected based on the small driving force.

Figure 7:
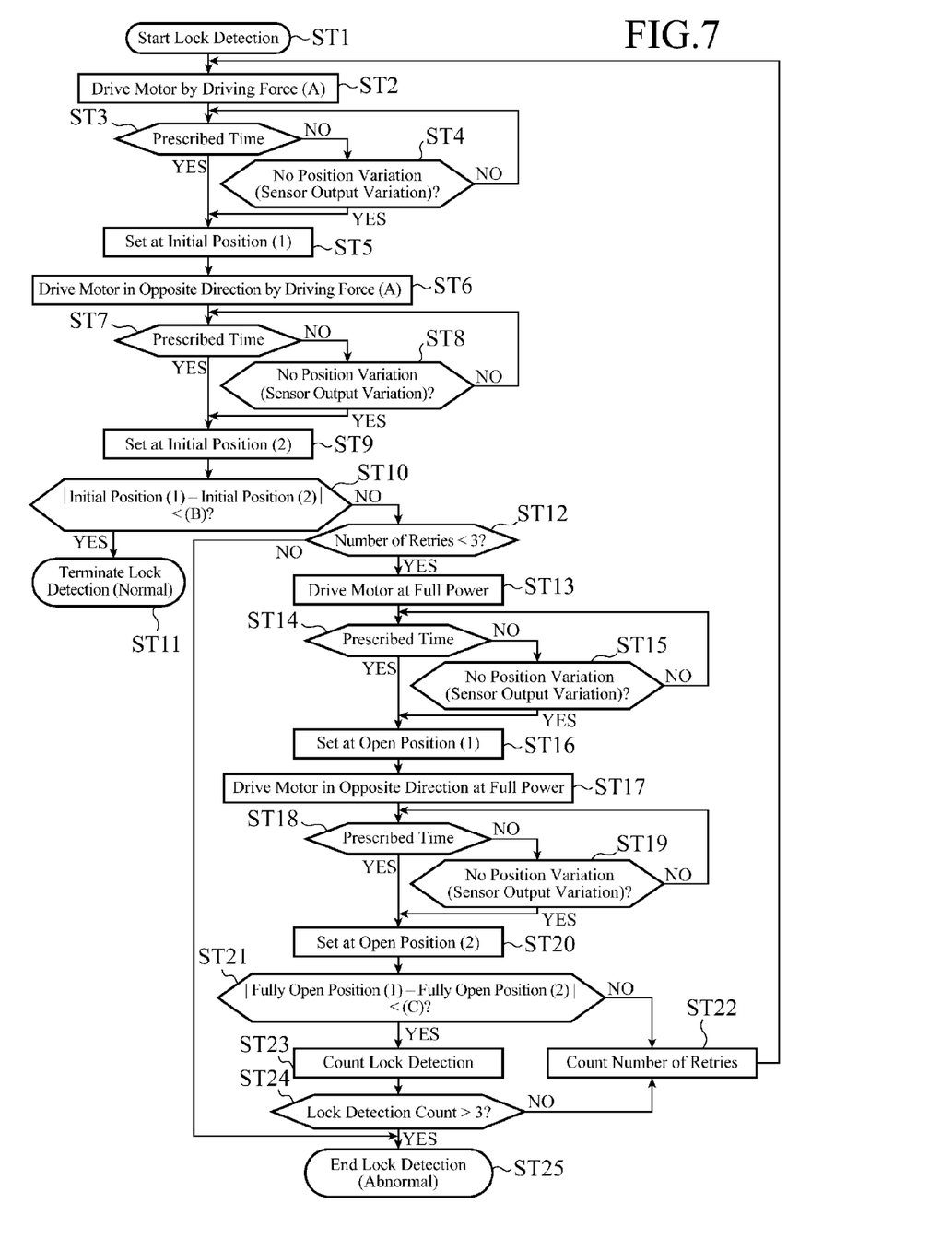
FIG. 7 is a flowchart illustrating lock detection and lock release operations.

FIG. 7 is a flowchart illustrating a lock detecting and releasing operation performed in relation to the valve 3 or the valve 4. First, when the lock detection operation is started on the valves 3, 4 (step ST1), the motor 1 is driven by a driving force (A) (step ST2), whereupon a determination is made as to whether or not a prescribed time has elapsed (step ST3). When the determination is negative, a determination is made as to whether or not no positional variation (sensor output variation) has occurred (step ST4), and when this determination is negative, the routine returns to step ST3, where the operation described above is continued.

When the determinations of step ST3 and step ST4 are affirmative, the corresponding position is set as the initial position (1) (step ST5), whereupon the motor is driven in an opposite direction by the driving force (A) (step ST6) and a determination is made as to whether or not a prescribed time has elapsed (step ST7). When the determination is negative, a determination is made as to whether or not no positional variation (sensor output variation) has occurred (step ST8), and when this determination is negative, the routine returns to step ST7, where the operation described above is continued. When the determinations of step ST7 and step ST8 are affirmative, on the other hand, the corresponding position is set as the initial position (2) (step ST9), whereupon a determination is made as to whether or not |initial position (1)−initial position (2)|<lock detection determination width (B). When the determination is affirmative, it is determined that valve opening and closing are normal and the lock detection operation is ended (step ST11).

When the determination of step ST10 is negative, a determination is made as to whether or not a number of retries<3, for example (step ST12). When this determination is negative, it is determined that a valve abnormality has occurred, and the lock detection operation is terminated (step ST25). When the determination of step ST12 is affirmative, on the other hand, the motor is driven at full power (step ST13), whereupon a determination is made as to whether or not a prescribed time has elapsed (step ST14). When the determination is negative, a determination is made as to whether or not no positional variation (sensor output variation) has occurred (step ST15), and when this determination is negative, the routine returns to step ST14, where the operation described above is continued.

When the determinations of step ST14 and step ST15 are affirmative, the corresponding position is set at the fully open position (1) (step ST16), whereupon the motor is driven in the opposite direction at full power (step ST17) and a determination is made as to whether or not a prescribed time has elapsed (step ST18). When the determination is negative, a determination is made as to whether or not no positional variation (sensor output variation) has occurred (step ST19), and when this determination is negative, the routine returns to step ST18, where the operation described above is continued. In this manner, when the motor is driven in the opposite direction at full power, the stuck valve can be forcibly closed. When the determinations of step ST18 and step ST19 are affirmative, on the other hand, the corresponding position is set at the fully open position (2) (step ST20), whereupon a determination is made as to whether or not |fully open position (1)–fully open position (2)|<cleaning operation determination width (C) (step ST21).

When the determination of step ST21 is affirmative, a lock detection count is performed (step ST23), whereupon a determination is made as to whether or not a lock detection count>3 (step ST24). When this determination is affirmative, the routine advances to step ST25, where it is determined that a valve abnormality has occurred and the lock detection operation is terminated. When the determinations of step ST21 and step ST24 are negative, the number of retries is counted, whereupon the routine returns to step ST1.

Note that (1) and (2) affixed to the initial positions and fully open positions as described above correspond to (1) and (2) affixed to the initial positions and fully open positions in FIG. 7, respectively.

According to the fourth embodiment, as described above, a lock detection is performed, whereupon the valve is operated in the closing direction by driving the motor in an opposite direction to that of valve opening control, such that hole surfaces 7a-2, 8a-2 opposite to those of the valve opening operation are abutted against the arm members 17a, 18a. Thus, even when the valve is stuck or locked on the way to opening of the valve due to the mixing of foreign matter or the like, the locked valve can be forcibly closed, and as a result, inconveniences involved in valve locking can be avoided.

Fifth Embodiment

Figure 8:
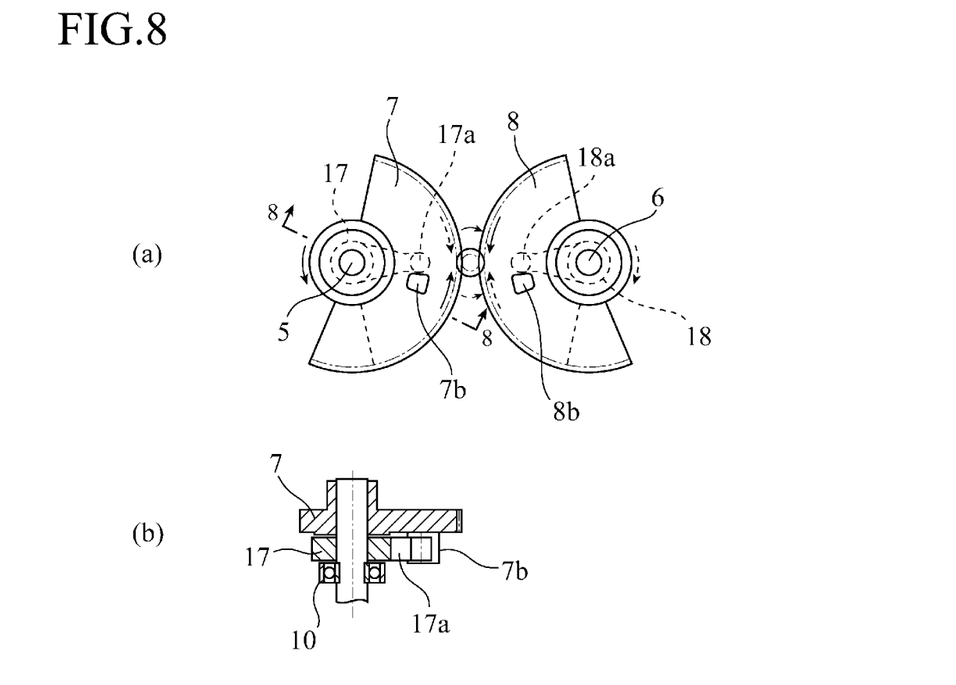
FIG. 8 is a view showing a first modified example of an abutment portion between a gear and an arm member.

In the embodiments described above, the gear and the arm member are configured such that the arm member is inserted into the hole provided in the gear and abutted against the edge of the hole. FIGS. 8(a) and 8(b) are views showing a modified example of the abutment portion between the gear and the arm member according to a fifth embodiment, in which projecting portions 7b, 8b are provided on the gears 7, 8 such that the arm members 17a, 18a are abutted against the projecting portions 7b, 8b. With this configuration, the gears 7, 8 can be reduced in size in comparison with the case where the holes 7a, 8a are provided in the gears 7, 8, as in the first to fourth embodiments. Note that FIG. 8(b) is a longitudinal sectional view taken along a line 8-8 in FIG. 8(a).

Sixth Embodiment

Figure 9:
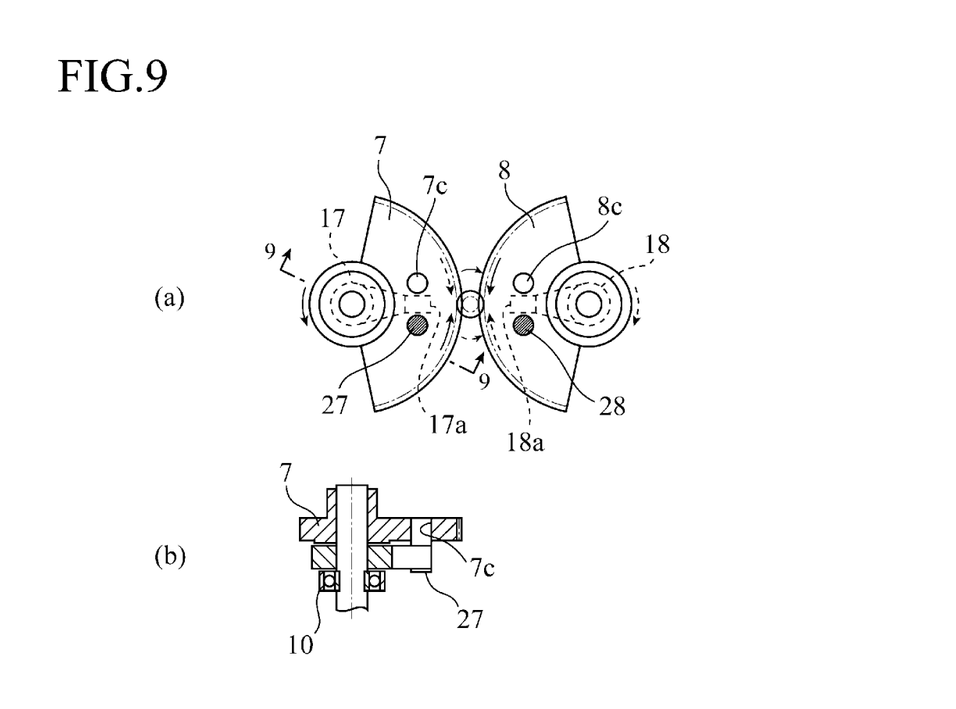
FIG. 9 is a view showing a second modified example 2 of an abutment portion between a gear and an arm member.

FIGS. 9(a) and 9(b) are views showing a modified example of the abutment portion between the gear and the arm member according to a sixth embodiment, in which the projecting portions of the fifth embodiment can be formed by providing pin insertion holes 17c, 18c in the gears 7, 8 and press-fitting pins 27, 28 into the pin insertion holes 17c, 18c. With this configuration, the same gear can be used on both the left and right sides by varying insertion positions in which the pins 27, 28 are inserted. Note that FIG. 9(b) is a longitudinal sectional view taken along a line 9-9 in FIG. 9(a).

Seventh Embodiment

Figure 10:
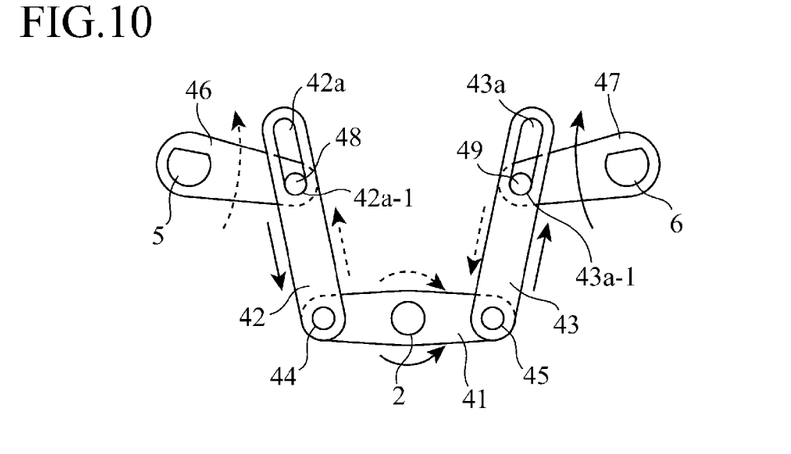
FIG. 10 is a constitutional view in which a link is used as a transmission member.

FIG. 10 is a view showing a valve opening and closing mechanism according to a seventh embodiment of the invention. In the first to sixth embodiments, gears are used as the power transmission members for transmitting the power of the input shaft 2 to the output shafts 5, 6, but in the seventh embodiment, links are used as the power transmission members. In this configuration, an intermediate portion of a lever 41 is attached to the input shaft 2, and end portions of links 42, 43 are coupled to respective end portions of the lever 41 to be free to bend by coupling pins 44, 45. Further, pins 48, 49 provided on respective tip ends of crank levers 46, 47 attached to the output shafts 5, 6 are engaged with elongated holes 42a, 43a formed in the links 42, 43.

With this configuration, when the input shaft 2 rotates in the direction of a solid line arrow, as shown in the drawing, the lever 41 rotates in the counterclockwise direction such that the link 42 is pulled downward and the link 43 is pushed upward in the drawing. As a result, a hole edge 43a-1 of the elongated hole 43a in the link 43 causes the crank lever 47 to rotate in the clockwise direction via the pin 49. In other words, the power of the input shaft 2 is transmitted to the output shaft 6. At this time, a hole edge 42a-1 of the elongated hole 42a in the pulled down link 42 moves away from the pin 48 of the crank lever 46, and therefore the power of the input shaft 2 is not transmitted to the output shaft 5.

On the other hand, contrary to the above, when the input shaft 2 rotates in the direction of a dotted line arrow, the lever 41 rotates in the clockwise direction such that the link 42 is pushed upward and the link 43 is pulled downward in the drawing. As a result, the hole edge 42a-1 of the elongated hole 42a in the link 42 causes the crank lever 46 to rotate in the counterclockwise direction via the pin 48. In other words, the power of the input shaft 2 is transmitted to the output shaft 5. At this time, the hole edge 43a-1 of the elongated hole 43a in the pulled down link 43 moves away from the pin 49 of the crank lever 47, and therefore the power of the input shaft 2 is not transmitted to the output shaft 6.

As described above, with the seventh embodiment employing links as the power transmission members, power transmission can be performed similarly to the embodiments employing gears as the power transmission members, and therefore similar actions and effects are obtained.

Eighth Embodiment

Figure 11:
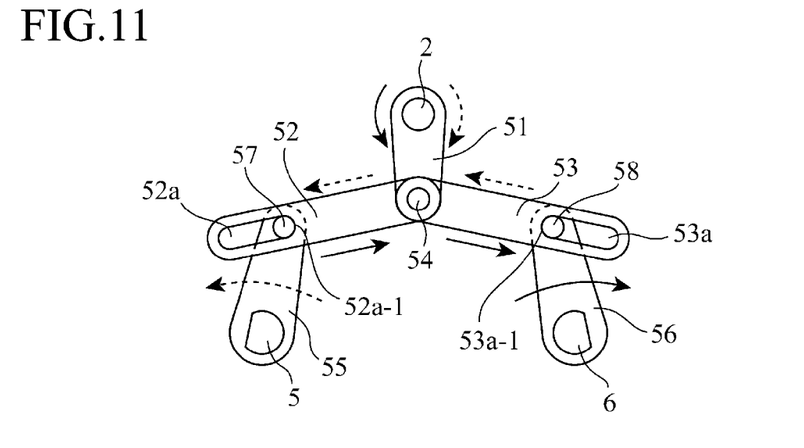
FIG. 11 is a constitutional view showing another modified example in which a link is used as a transmission member.

FIG. 11 is a view showing a valve opening and closing mechanism according to an eighth embodiment of the invention, which is a modified example of the seventh embodiment employing links as the power transmission members. In the eighth embodiment, a crank lever 51 is attached to the input shaft 2, and end portions of links 52, 53 are coupled to an end portion of the lever 51 to be free to bend by a coupling pin 54. Further, pins 57, 58 provided on respective tip ends of crank levers 55, 56 attached to the output shafts 5, 6 are engaged with elongated holes 52a, 53a formed in the links 52, 53.

With this configuration, when the input shaft 2 rotates in the direction of a solid line arrow, as shown in the drawing, the lever 51 rotates in the counterclockwise direction such that the links 52, 53 are moved in a rightward direction in the drawing. As a result, a hole edge 53a-1 of the elongated hole 53a in the link 53 causes the crank lever 56 to rotate in the clockwise direction via the pin 58. In other words, the power of the input shaft 2 is transmitted to the output shaft 6. At this time, a hole edge 52a-1 of the elongated hole 52a in the link 52 moves away from the pin 57 of the crank lever 55, and therefore the power of the input shaft 2 is not transmitted to the output shaft 5.

Conversely, when the input shaft 2 rotates in the direction of a dotted line arrow, the lever 51 rotates in the clockwise direction such that the links 52, 53 are moved in a leftward direction in the drawing. As a result, the hole edge 52a-1 of the elongated hole 52a in the link 52 causes the crank lever 55 to rotate in the counterclockwise direction via the pin 57. In other words, the power of the input shaft 2 is transmitted to the output shaft 5. At this time, the hole edge 53a-1 of the elongated hole 53a in the link 53 moves away from the pin 58 of the crank lever 56, and therefore the power of the input shaft 2 is not transmitted to the output shaft 6.

As described above, with the eighth embodiment, which is a modification of the seventh embodiment employing links as the power transmission members, power transmission can be performed similarly to the embodiments employing gears as the power transmission members, and therefore similar actions and effects are obtained.

Ninth Embodiment

Figure 12:
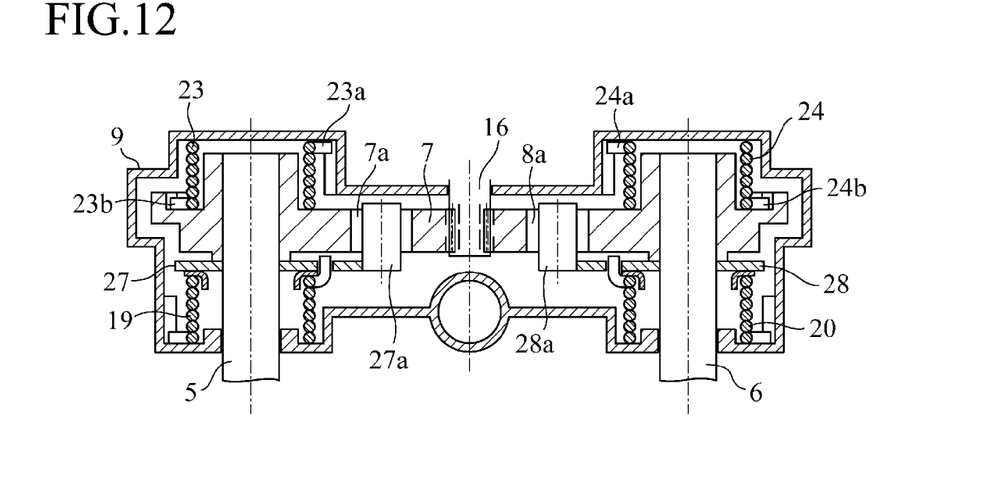
FIG. 12 is a longitudinal sectional view showing the main parts of a modified example of the configuration shown in FIG. 2, in which a preload is applied to the gear in the opposite direction to the preloads applied to the respective output shafts.
Figure 13:
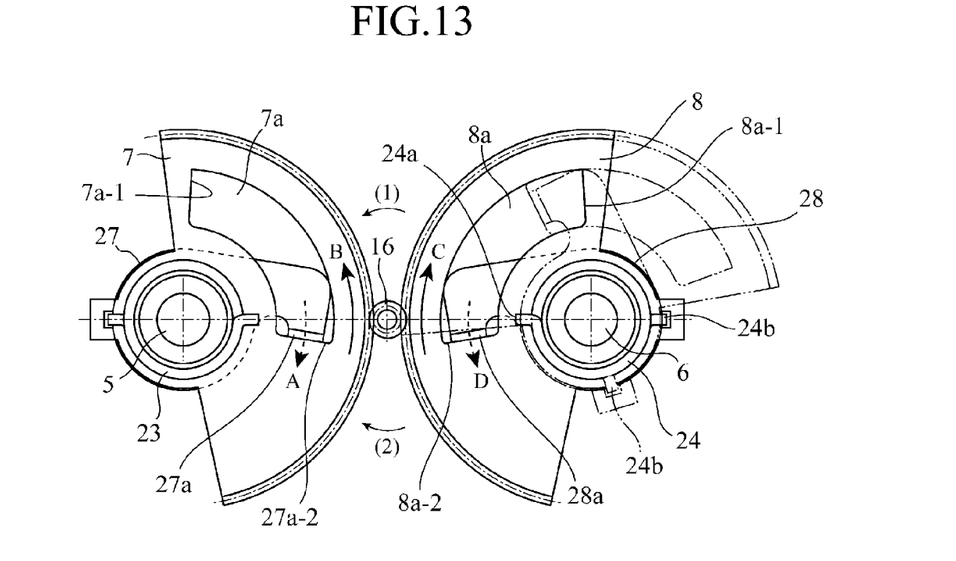
FIG. 13 is a plan view of FIG. 12 where a valve housing is removed.

FIGS. 12 and 13 are a longitudinal sectional view and a plan view showing the main parts of a modified example of the configuration according to the second embodiment, in which preloads are applied to the gears in an opposite direction to the preloads applied to the respective output shafts. In this configuration, boxes 17, 18 attached to the output shafts 5, 6 are used as plate bodies 27, 28, and end portion bent portions 27a, 28a of the plate bodies 27, 28 are engaged with the holes 7a, 8a provided in the gears 7, 8. Further, one end of the coil springs 23, 24 is fixed to the gears 7, 8, and the other end is fixed to the valve housing 9.

When the coil springs 23, 24 are provided between the valve housing 9 and the gears 7, 8 serving as the constitutional elements of the power transmission members, as in this configuration, a spring load direction of the coil spring 19 acting on the left side output shaft 5 is set as A, a spring load direction of the coil spring 23 acting on the left side power transmission member is set as B, a spring load direction of the coil spring 24 acting on the right side power transmission member is set as C, and a spring load direction of the coil spring 20 acting on the right side output shaft 6 is set as D.

When the pinion gear 16 is rotated in the direction of (1), the right side output shaft 6 rotates in the clockwise direction together with the gear 8, and when the plate body 28 is pushed via the end portion bent portion 28a engaged with the hole 8a provided in the gear 8, the output shaft 6 integrated with the plate body 28 also rotates in the clockwise direction. As a result, the coil spring 24 provided between the valve housing 9 and the gear 8 rotates so as to release a preload. However, the coil spring 24 must also secure a required preload at a rotation terminal of the plate body 28, indicated by shading, and therefore a force of the preload of the coil spring 24 in the illustrated position must be a large preload force to which an applied force released by the aforesaid rotation is added. Hence, to secure a self-returning property, a preload surmounting this preload force must be applied to the output shaft 6, leading to an increase in the preload force of the coil spring 20, which applies a preload in an opposite direction to the coil spring 24. Note that when the pinion gear 16 is rotated in the direction of (2), a similar phenomenon occurs in the coil springs 23, 19.

Figure 14:
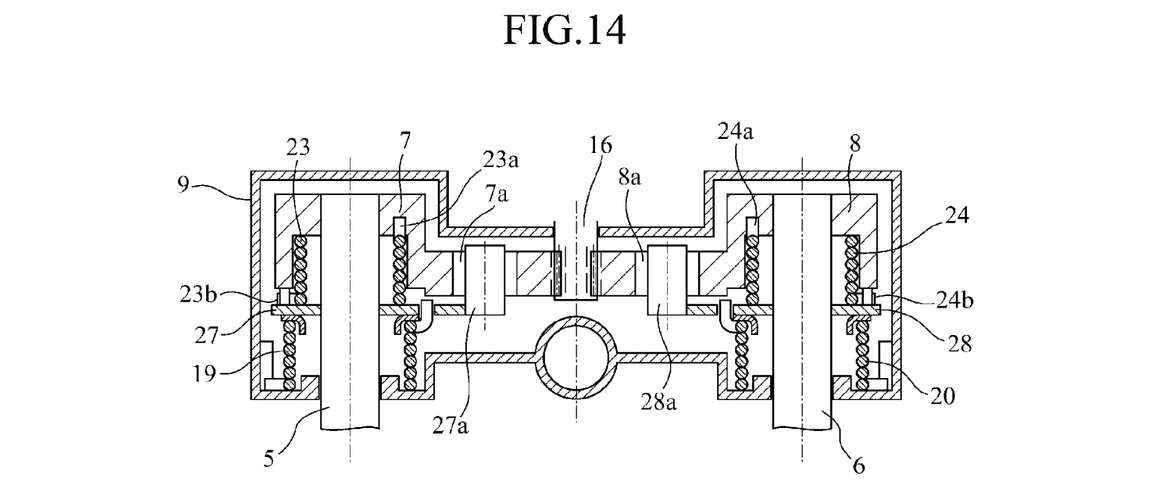
FIG. 14 is a longitudinal sectional view showing the main parts of another configuration for applying a preload to the gear in the opposite direction to the preloads applied to the respective output shafts.
Figure 15:
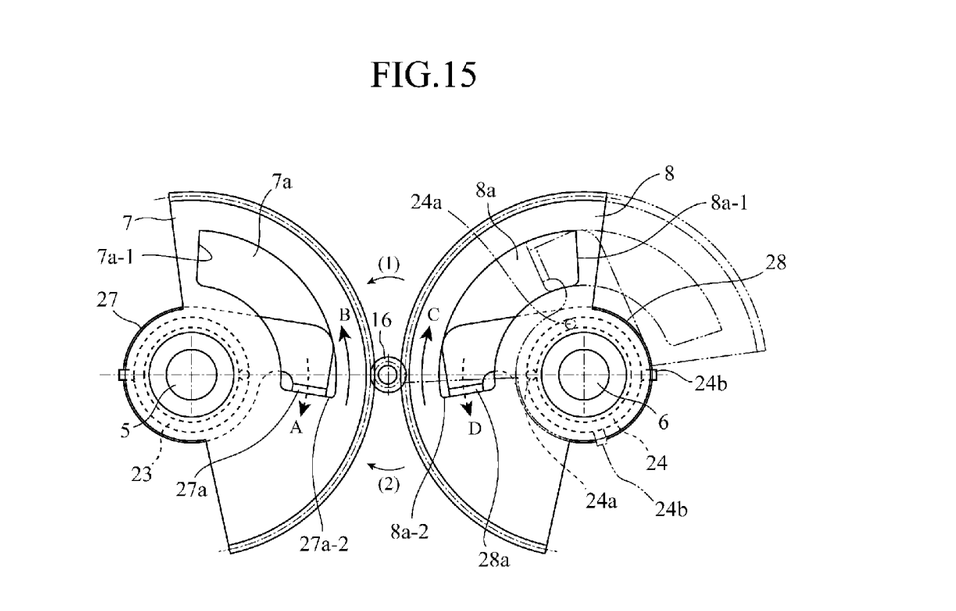
FIG. 15 is a plan view of FIG. 14 where a valve housing is removed.

FIGS. 14 and 15 are a longitudinal sectional view and a plan view showing the main parts of a configuration according to a ninth embodiment for applying preloads to the gears in an opposite direction to the preloads applied to the respective output shafts. In this configuration, the need for a large preload force in the configuration of FIGS. 12 and 13 is eliminated by forming the coil springs 23, 24 that apply preloads to the gears 7, 8 such that one end 23a, 24a thereof is fixed to the gears 7, 8 and another end 23b, 24b thereof is fixed to the output shafts 5, 6 via the plate body 28.

When the coil springs 23, 24 are provided between the output shafts 5, 6 and the gears 7, 8 serving as the constitutional elements of the power transmission members, as in this configuration, the spring load direction of the coil spring 19 acting on the left side output shaft 5 is set as A, the spring load direction of the coil spring 23 acting on the left side power transmission member is set as B, the spring load direction of the coil spring 24 acting on the right side power transmission member is set as C, and the spring load direction of the coil spring 20 acting on the right side output shaft 6 is set as D.

When the pinion gear 16 is rotated in the direction of (1) in the illustrated condition, the right side output shaft 6 rotates in the clockwise direction together with the gear 8, and when the plate body 28 is pushed via the end portion bent portion 28a engaged with the hole 8a provided in the gear 8, the output shaft 6 integrated with the plate body 28 also rotates in the clockwise direction. However, the one end 24a of the coil spring 24 moves to a shaded position together with the gear 8, and the other end 24b also moves to the shaded position together with the plate body 28 integrated with the output shaft 6. Hence, a rotary force for releasing a preload does not act on the coil spring 24. Accordingly, the coil spring 24 need only apply a required minimum preload force in the illustrated position, and therefore the preload force required of the coil spring 20 to secure a self-returning property can be reduced. As a result, a load required for the valve operation can be lightened, and the valves can be driven at a fast response speed using power having a smaller output. Note that when the pinion gear 16 is rotated in the direction of (2), the preload force of the coil springs 23, 19 can be reduced by a similar operation to that described above.

INDUSTRIAL APPLICABILITY

The valve opening and closing mechanism according to the present invention is suitable for use in an EGR system provided with a passage that passes through a cooler and a passage that does not pass through the cooler, which switches between the passages in accordance with an exhaust gas temperature.

The invention claimed is:

1. A valve opening and closing mechanism, comprising:
   an input shaft driven by a power source;
   two or more output shafts each including a valve;
   power transmission members that transmit power from the input shaft to the respective output shafts with varying a phase of the power; and
   preload application members that apply preloads respectively to the output shaft and the power transmission members in opposite directions.

2. The valve opening and closing mechanism according to claim 1, wherein the preload application member to the power transmission member is disposed between the output shaft and the power transmission member.

3. The valve opening and closing mechanism according to claim 1, wherein a speed reduction ratio of the power transmission member is variable.

4. The valve opening and closing mechanism according to claim 1, wherein an axial direction arrangement of the power transmission member is variable.

5. The valve opening and closing mechanism according to claim 1, wherein a sensor for detecting a position is provided on the one power transmission member to detect a position of each of the output shafts.

6. The valve opening and closing mechanism according to claim 1, wherein a sensor for detecting a position of the valve is provided on each of the output shafts.

7. The valve opening and closing mechanism according to claim 1, wherein an abutment portion between the output shaft and the power transmission member is also provided on an opposite side to a driving direction.

8. The valve opening and closing mechanism according to claim 1, wherein the power transmission member is a gear.

9. The valve opening and closing mechanism according to claim 1, wherein the power transmission member is a link.

* * * * *